(12) United States Patent
Noll et al.

(10) Patent No.: US 8,775,548 B2
(45) Date of Patent: Jul. 8, 2014

(54) EXTENDING SHARING OPTIONS OF LOCAL COMPUTING RESOURCES

(75) Inventors: Lindsey R. Noll, Redmond, WA (US);
Steve Seixeiro, Snohomish, WA (US);
Jerry K. Koh, Redmond, WA (US);
Anshul Rawat, Redmond, WA (US);
Sunil P. Gottumukkala, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 673 days.

(21) Appl. No.: 12/163,529

(22) Filed: Jun. 27, 2008

(65) Prior Publication Data

US 2009/0327447 A1    Dec. 31, 2009

(51) Int. Cl.
*G06F 15/167* (2006.01)

(52) U.S. Cl.
USPC ............ 709/216; 709/213; 709/214; 709/215

(58) Field of Classification Search
USPC ........................... 709/213–219; 711/147–153
See application file for complete search history.

(56) References Cited

U.S. PATENT DOCUMENTS

| | | | |
|---|---|---|---|
| 5,628,005 A | 5/1997 | Hurvig | |
| 5,838,300 A | 11/1998 | Takagi | |
| 6,874,152 B2 | 3/2005 | Vermeire | |
| 2004/0064418 A1 | 4/2004 | Koster | |
| 2004/0187027 A1 | 9/2004 | Chan | |
| 2004/0199514 A1 | 10/2004 | Rosenblatt | |
| 2005/0021780 A1 | 1/2005 | Beyda | |
| 2005/0149481 A1 | 7/2005 | Hesselink | |
| 2007/0233647 A1 | 10/2007 | Rawat | |
| 2008/0133649 A1* | 6/2008 | Pennington et al. | 709/203 |
| 2008/0154903 A1* | 6/2008 | Crowley et al. | 707/9 |
| 2008/0183680 A1* | 7/2008 | Meynier et al. | 707/3 |

OTHER PUBLICATIONS

Shareware Network File Sharing and Disk Sharing 6.0 Description (Webpage, no author listed) Feb. 1, 2006 http://www.bluechillies.com/details/32960.html.
MioNet Services (Webpage, no author listed) Apr. 16, 2008 http://www.westerndigital.com/en/products/software/index.asp?familyID=200.
Omnidrive (Webpage, no author listed) Apr. 16, 2008 http://www.omnidrive.com/products/.

* cited by examiner

*Primary Examiner* — Umar Cheema
(74) *Attorney, Agent, or Firm* — Sung Kim; Brian Haslam; Micky Minhas

(57) ABSTRACT

A method, system, and medium are provided for sharing items residing on a computing device. Items selected for sharing can be made simultaneously available to users on a local network and to users outside of the local network. A remote sharing service allows access to copies of items based on user identifiers associated. Local attributes associated with items are modified such that the user identifiers are associated with the items for providing access via a local network.

20 Claims, 11 Drawing Sheets

EXTENDING SHARING OPTIONS OF LOCAL COMPUTING RESOURCES

SUMMARY

The present invention is defined by the claims below, not this summary. This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter. Embodiments of the present invention provide for coordinating the sharing of an item residing on a first computing device with a user by way of a remote sharing service and a local sharing application In a first aspect, a set of computer-executable instructions provides a method of sharing an item that includes receiving an indication that the item is to be shared with a user who is associated with a user identifier. A copy of the item is provided to a remote sharing service that permits access to the copy based on the user identifier. The user identifier is associated with an attribute of the item for providing immediate access to the item by way of communication with the first computing device.

In another illustrative aspect, a set of computer-executable instructions provides another method of sharing an item that resides on a first computing device. One embodiment of the method includes providing a user interface that presents a sharing option for sharing the item with a user who is associated with a user identifier by way of a remote sharing service. The embodiment further includes receiving a selection of the sharing option causing configuration of the user's sharing experience. An attribute of the item is modified such that the user is immediately permitted to access the item from a second computing device upon establishing a connection with the first computing device.

In a third illustrative aspect, a set of computer-executable instructions provides another method of sharing an item residing on a first computer. One embodiment includes displaying an option for invoking a remote sharing service that maintains an association between a user and a user identifier. The embodiment also includes invoking the remote sharing service such that the remote sharing service retrieves a copy of the item and allows access to the copy based on the user identifier. The embodiment further includes modifying an attribute of the item such that permission to access the item is associated with the user identifier. According to the embodiment, an indication is received indicating that the user is attempting to access the item from a second computing device coupled to the first computing device by way of a LAN, and access is granted to the item incident to verifying that the user is associated with the user identifier.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention provide systems and methods for sharing an item residing on a first computing device with a user who is associated with a user identifier by synchronizing sharing operations between a remote sharing service and a local sharing application.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

ACE Access Control Entry
ACL Access Control List
DACL Discretionary Access Control List
MACL Mandatory Access Control List
LAN Local Area Network
UI User Interface
WAN Wide Area Network The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, and the like. The invention may also be practiced in distributed computing environments where tasks are performed by remote-processing devices that are linked through a communications network.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-executable instructions, data structures, program modules, and other data representations. Media examples include, but are not limited to, RAM, ROM, EEPROM, flash memory and other memory technology, CD-ROM, digital versatile discs (DVD), holographic media and other optical disc storage, magnetic cassettes, magnetic tape, magnetic disk storage, and other magnetic storage devices. These technologies can store data momentarily, temporarily, or permanently.

Figure 1:
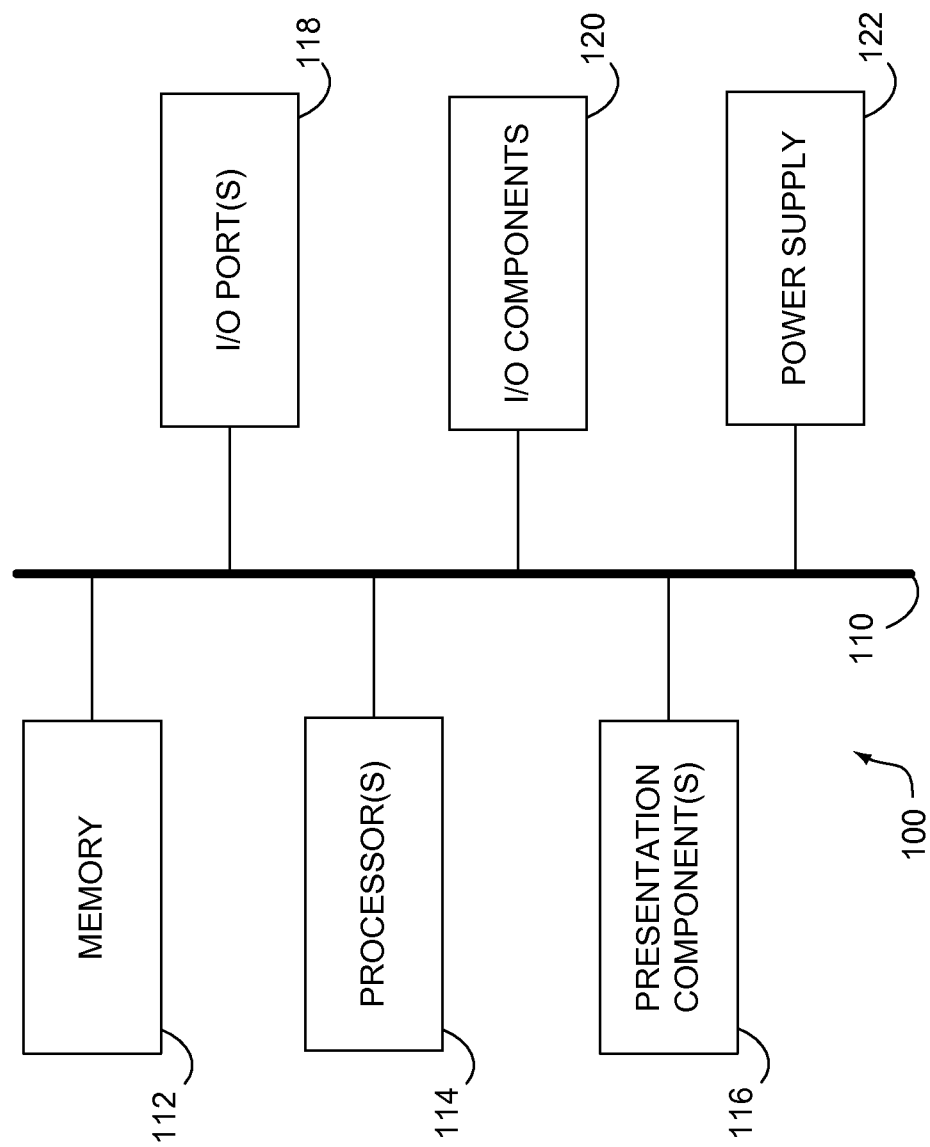
FIG. 1 is a block diagram showing an exemplary computing device in accordance with an embodiment of the present invention.

An exemplary operating environment in which various aspects of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, keyboard, pen, voice-input device, touch-input device, touch-screen device, interactive display device, or a mouse.

Figure 2:
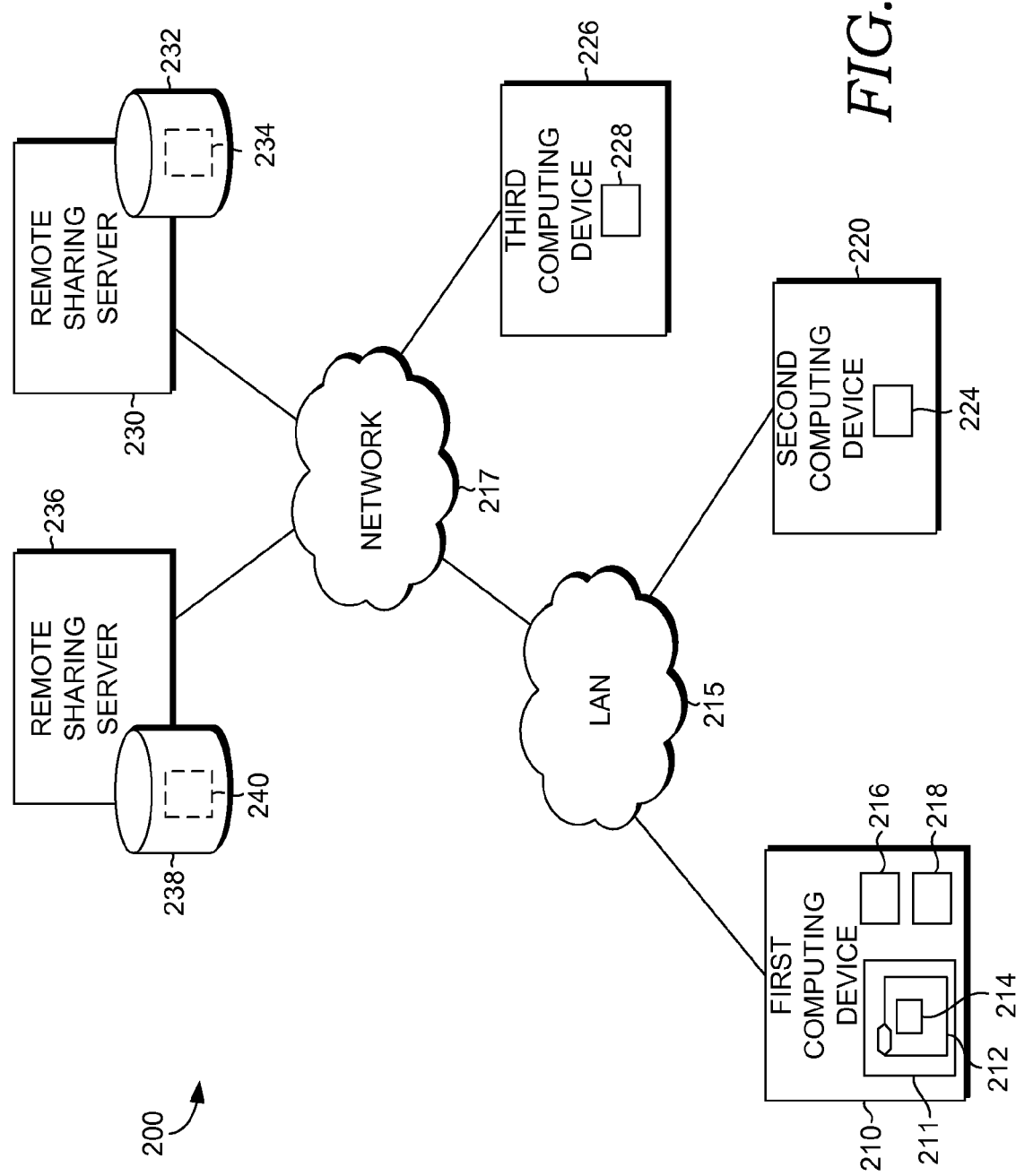
FIG. 2 is a block diagram showing an exemplary networking environment suitable for implementation of an embodiment of the present invention.

Turning to FIG. 2, an exemplary networking environment 200 for implementing embodiments of the present invention is shown. Networking environment 200 includes a first computing device 210 and a second computing device 220 that can communicate with each other by way of a local area network (LAN) 215. As shown in FIG. 2, networking environment 200 also includes a third computing device 226 and remote sharing servers 230 and 236 connected by way of a network 217. Network 217 may be a wide area network (WAN) such as, for example, the Internet. Additionally, computing devices 210, 220, and 226 may communicate with each other and/or with remote sharing servers 230 and 236 by way of network 217. Although computing devices 210 and 220 are illustrated as being connected by LAN 215, computing devices 210 and 220 may be directly connected to each other in an embodiment. In another embodiment, computing devices 210 and 220 may be directly connected to network 217.

Networking environment 200 is merely an example of one suitable networking environment and is not intended to suggest any limitation as to the scope of use or functionality of the present invention. Neither should networking environment 200 be interpreted as having any dependency or requirement related to any single component or combination of components illustrated therein. Computing devices 210, 220, and 226 can be any type of computing device that is capable of communicating via LAN 215 and/or network 217, and may be, for example, computing devices such as computing device 100 described above with reference to FIG. 1.

As shown in FIG. 2, computing device 210 includes a file system 211, which has stored thereon items 212 and 214. In an embodiment, for example, item 212 is a file. In other embodiments, items 212 and/or 214 can include multimedia files, documents, applications, devices, and the like. In one embodiment, item 212 is a folder that contains a file 214. In another embodiment, item 214 is a device such as a connected hard drive, a scanner, or a printer. Of course, file system 211 can include a plurality of folders or other containers used for grouping files and other items. In other embodiments, file system 211 may reside on a separate machine from computing device 210, such as on a file server or print server. Throughout the present document, folders, files, programs, images, devices, and the like will be referred to generally as "items."

Computing device 210 also includes a sharing-service application 216 that is associated with a remote sharing service hosted by a remote sharing server 230 or 236. Sharing-service application 216 can be installed, according to an embodiment, upon registration of the remote sharing service with computing device 210. Sharing-service application 216 facilitates sharing items such as folder 212 and/or file 214 with users associated with other computing devices such as, for example, computing devices 220 and 226. In one embodiment, invocation of sharing-service application 216 enables a user of computing device 210 to utilize item-sharing services offered by an associated remote sharing service hosted by a remote sharing server 230 or 236. In various embodiments, remote sharing servers 230 and 236 retrieve a copy of an item to be shared and maintain that copy such that other users can access it. In various embodiments, computing device 210 includes more than one sharing application. In some embodiments, computing device 210 communicates with a number of sharing services, and includes a local application for each service. According to an embodiment of the present invention, all of the sharing applications available on computing device 210 can be accessed from a single user interface such as, for example, a pull-down menu having buttons or other selectable options (e.g., icons) representing each sharing service.

According to various embodiments, sharing-service application 216 enables a user of computing device 210 to apply various types of access permission settings, which specify a type of access to an item that a particular user is permitted, to an item such as, for example, by modifying a security descriptor associated with an item. A security descriptor can include an access control list (ACL) such as a mandatory access control list (MACL) or a discretionary access control list (DACL). In various embodiments, a security descriptor includes both types of ACLs. In other embodiments, security descriptors include other structures used for authorizing access to a particular item such as, for example, domain names, log-in names, and the like.

With continued reference to FIG. 2, computing device 210 further includes a local sharing application 218 that facilitates sharing items with other users who have access to computing device 210 such as by way of LAN 215. Local sharing application 218 enables users of computing devices other than computing device 210 such as, for example, computing device 220 to access items stored on computing device 210. As with sharing-service application 216, local sharing application 218 enables a user of computing device 210 to apply access permission settings to items by modifying associated security descriptors. Furthermore, in some embodiments, ACLs or other security descriptors are created, managed, and modified by way of a directory service such as, for example, Active Directory, a technology developed by Microsoft Corporation of Redmond, Wash. In other embodiments, security descriptors are created, managed, and modified by a user of computing device 210.

In some embodiments, local sharing application 218 is not a full-scale application, but rather is a service or other functionality enabled by a program module, communications protocol, application programming interface (API), or the like. For example, in one embodiment, local sharing application 218 includes a package of services enabled by the Server Message Block (SMB) protocol such as the Common Internet File System (CIFS), available from Microsoft Corporation of Redmond Wash.

In an embodiment, local sharing application 218 includes a native application or software module residing on computing device 210 and in another embodiment, local sharing application 218 includes an application or software module associated with remote sharing server 230 or 236. In a further embodiment, local sharing application 218 includes an API that is called by sharing-service application 216 to ACL items to online identities. Embodiments of the present invention are capable of similar functionality regardless of the security methods used. In some cases, for example, access to items is managed by utilizing NT Domain authentication, login authentication, and the like. Additionally, an item may have a number of corresponding ACLs.

Although not illustrated in FIG. 2, in some embodiments, there can be one or more interfaces disposed between sharing service application 216 and local sharing application 218 such that sharing-service application 216 can apply access permission settings associated with copies of items shared using an associated sharing service to the items residing on computing device 210. In an embodiment, sharing-service application 216 interfaces with local sharing application 218 to provide local sharing application 218 with user identifiers associated with users that have been identified as having authority to access copies of the items that reside on computing device 210. Consequently, local sharing application 218 associates those user identifiers with the items such as by creating access control entries (ACEs) that include the user identifiers. Thus, for example, these ACEs can be applied to ACLs associated with items that are to be shared.

It should be noted that any kind of user identifier can be used in the implementation of various embodiments of the present invention such as, for example, a user's online identification, an email address, a log-in identifier, a network access identifier, a user-generated identifier, and the like. In various embodiments, the user identifier is used by remote sharing servers 230 or 236 to identify, authenticate, and/or authorize the associated user with regard to utilization of the sharing services provided by the remote sharing servers 230 or 236.

With continued reference to FIG. 2, computing device 220 also includes a local sharing application 224 and may additionally contain sharing-services applications, although for clarity, these are not illustrated in FIG. 2. Local sharing application 224 can be identical or similar to local sharing application 218. Local sharing application 224 is, in other embodiments, a different type of sharing application. In embodiments of the present invention, local sharing application 224 manages access permissions associated with items residing on computing device 220. Local sharing applications 218 and 224, either independently or in concert, facilitate the ability to share items among computing devices 210 and 220 by way of LAN 215. In still further embodiments, local sharing applications 218 and 224 facilitate sharing items by way of communication between computing devices 210 and 220.

As illustrated in FIG. 2, computing device 226 includes a sharing-services application 228 which, in various embodiments, is similar to sharing services application 216. In an embodiment, sharing services applications 216 and 228 both enable invocation and utilization of services provided by one of remote sharing servers 230 and 236. By utilizing those services, a user associated with computing device 210 can share items that reside on computing device 210 with another user associated with computing device 226.

In various embodiments, computing device 210 communicates a copy 234 or 240 of an item that is to be shared to remote sharing server 230 or 236 and a user associated with computing device 210 sets access permissions on that copy 234 or 240. Accordingly, a user associated with computing device 226 may access the copy 234 or 240 of the item according to the access permission settings. Remote sharing services such as those hosted by sharing servers 230 and 236 may provide a variety of services, functions, customizations, and other modifications to the sharing experience. All of these variables are contemplated within the ambit of the present invention.

As illustrated in FIG. 2 remote sharing servers 230 and 236 can communicate with any of computing devices 210, 220, and 226 by way of network 217. Remote sharing server 230, as illustrated in FIG. 2, includes a storage component 232 for storing content communicated from users of the sharing services offered by remote sharing service 230. Storage component 232 can be a data store, a database, a file system, or the like. Remote sharing server 230 is implemented on a computing device having a storage component and that the computing device and the storage component are scalable. In some embodiments, remote sharing server 230 includes a number of machines across which traffic is load-balanced. Additionally, storage component 232 can include a number of storage components hosted on various machines. The descriptions and illustrations herein are not intended to limit the configuration and/or architecture of sharing servers such as those illustrated in FIG. 2.

According to an embodiment of the present invention, remote sharing server 230 receives a copy 234 of an item to be shared from computing device 210 and maintains copy 234 in storage component 232. Access permission settings and other forms of security can be associated with copy 234, and access is granted to users associated with computing devices 210, 220, and/or 226, depending upon the access permissions set via remote sharing server 230. As illustrated in FIG. 2, remote sharing server 236 also includes a storage component 238 for maintaining copies 240 of an item for sharing. In an embodiment, remote sharing server 230 communicates with remote sharing server 236 for various reasons such as, for example, sharing items or copies of items between the two remote sharing servers 230 and 236.

Figure 3:
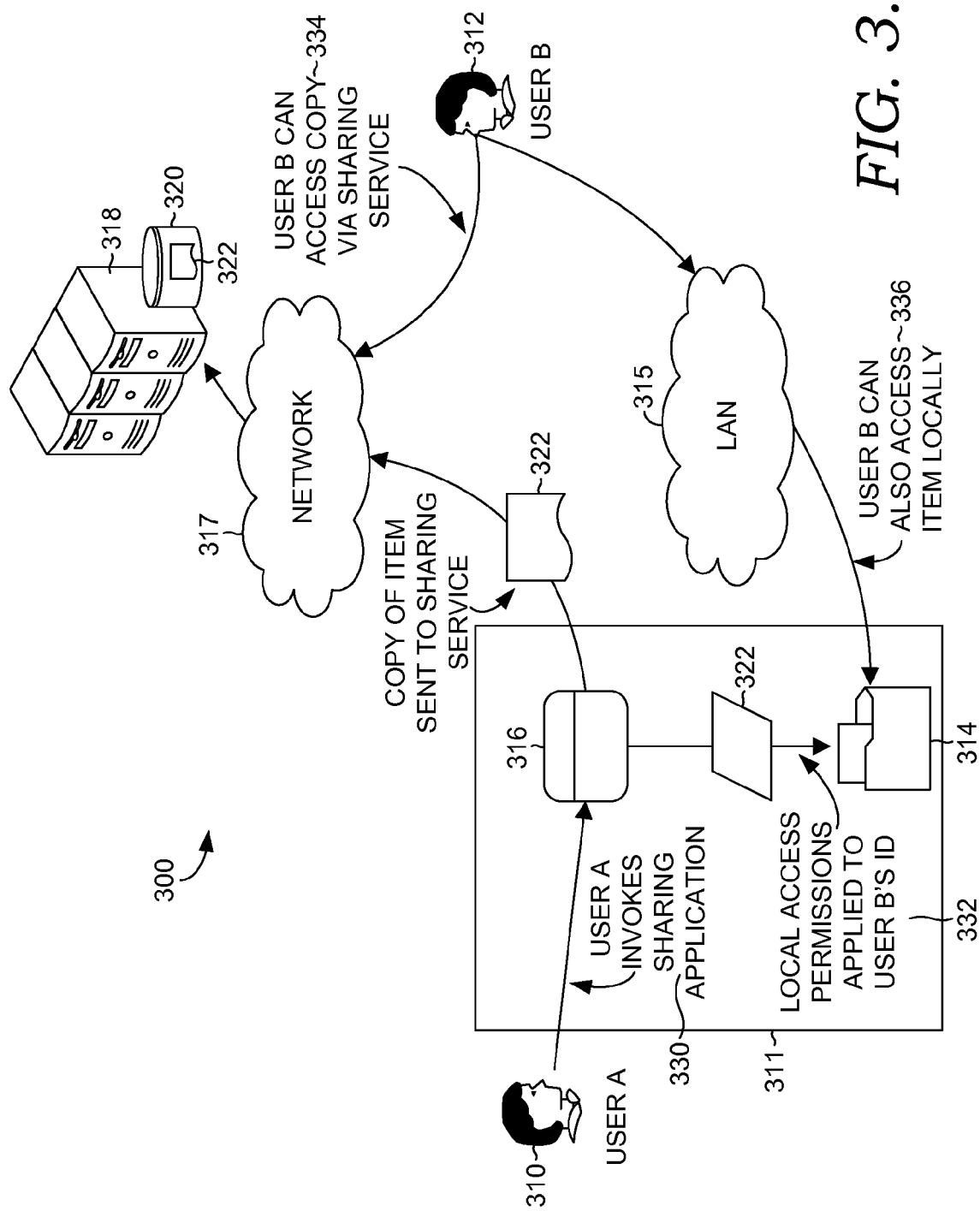
FIG. 3 is a schematic diagram showing communication flow in an exemplary networking environment suitable for implementation of an embodiment of the present invention.

Turning now to FIG. 3, another exemplary networking environment 300 for use in implementing embodiments of the present invention is illustrated. Exemplary networking environment 300 includes a first user, user A 310 and a second user, user B 312 that communicate with each other by way of LAN 315. In an embodiment, user A 310 and user B 312 are not initially connected to LAN 315. Nothing in the description or illustration herein is intended to suggest that user A 310 and user B 312 should be connected to LAN 315 and any given time. Networking environment 300 also includes a remote sharing server 318 having a storage component 320. Remote sharing server 318 can communicate with user A 310 and user B 312 by way of network 317, as illustrated in FIG. 3. In an embodiment, remote sharing server 318 is "peer" computing device where networking environment 300 is a peer-to-peer networking environment. In other embodiments, remote sharing server 318 includes a website through which items can be shared.

As illustrated at 330, user A 310 invokes a sharing-service application 316 to facilitate sharing an item 314 that resides on user A's 310 computing device 311 with user B 312. User B 312, although not illustrated in FIG. 3, is utilizing a computing device to communicate with various elements of exemplary networking environment 300. After navigating options lists and configurations that may, in some embodiments, be presented to user A 310 by sharing service application 316, sharing-service application 316 causes a copy 322 of the item 314 to be provided to remote sharing server 318. This copy 322 is maintained on a storage component 320 so that user B 312 can access it.

In addition to providing copy 322 to remote sharing server 318, sharing-service application 316 also causes a set of access permission settings to be applied to item 314, as illustrated at 332. In various embodiments, access permission settings applied to item 314 are similar to, or the same as, access permission settings associated with copy 322 as maintained by remote sharing server 318. In other embodiments, access permission settings are modified within computing device 311 such as, for example, to change the format into a format compatible with computing device 311. The access permission settings are applied to item 314 immediately upon initiating a sharing experience via sharing application 316. As illustrated at 334 and 336, respectively, user B 312 can access copy 322 when remote sharing server 318 has completed upload of copy 322 and has completed any internal processes and functions related to providing a sharing service, and user B 312 may immediately access item 314 from computing device 311, provided that user B 312 utilizes a computing device to connect to computing device 311. In some embodiments, this connection includes a connection by way of LAN 315.

Figure 4:
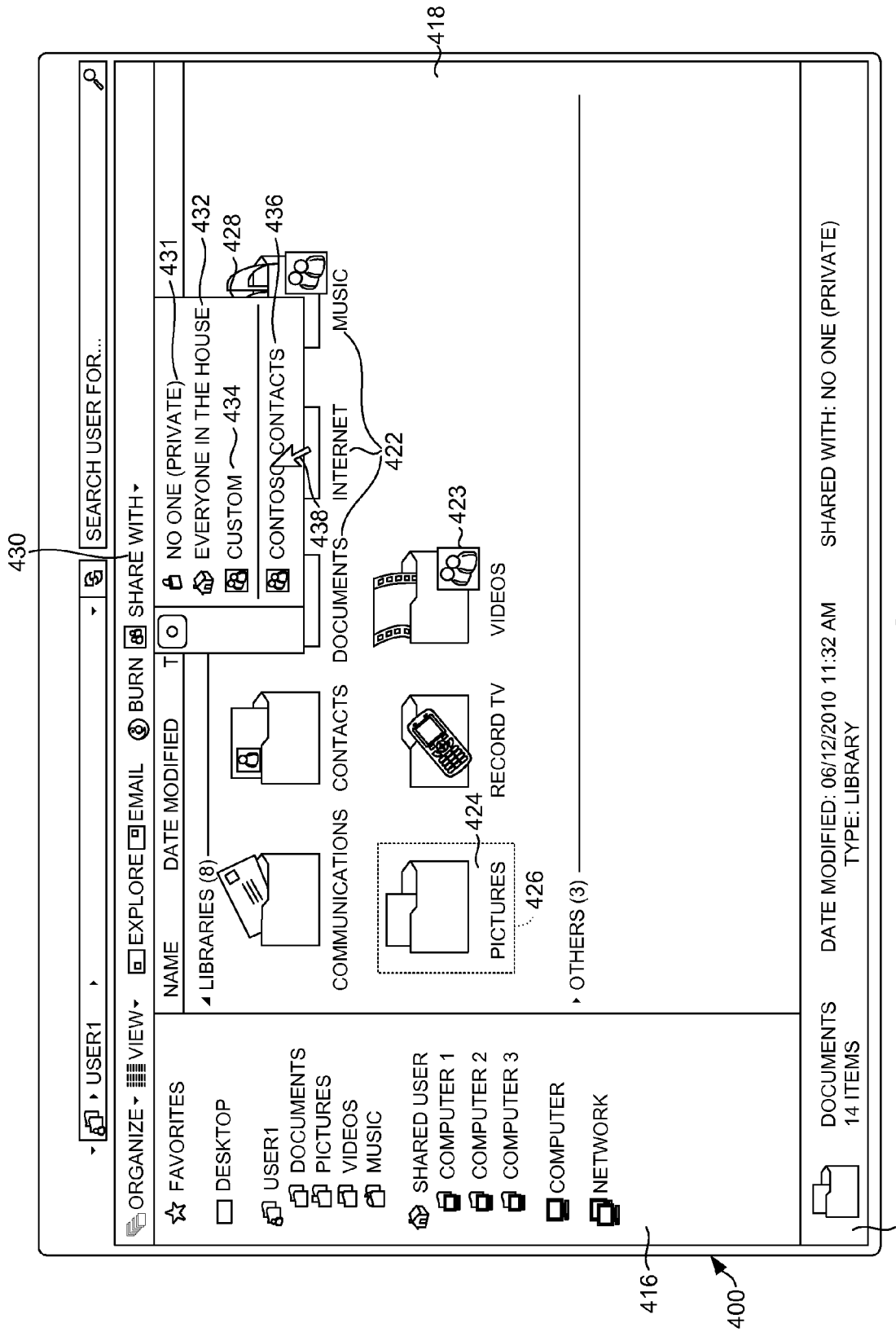
FIG. 4 is an exemplary screenshot showing an illustrative user interface in accordance with an embodiment of the present invention.

With reference to FIG. 4, an illustrative screenshot of an exemplary user interface 400 in accordance with an embodiment of the present invention is shown. In an embodiment, user interface (UI) 400 is provided to a user of a computing device and is associated with local sharing applications and services, as understood herein. UI 400 includes various features that are present in various embodiments of the present invention such as, for example, a viewing window 416 for displaying a hierarchical tree structure representative of an arrangement of a file system. As illustrated in FIG. 4, UI 400 also includes a viewing area 418 for displaying representations of various folders 422 or other items, and can include interactive functionality such that a user can manipulate and manage items within UI 400.

According to an embodiment of the present invention, a user can select one or more items 422 for sharing with another user. For example, in an embodiment, a user selects item 424. An indication is communicated to the associated computing device that indicates that item 424 has been selected for sharing with another user. As illustrated in FIG. 4, UI 400 also provides an indication 426 to the user such as, for example, a change in appearance, outline, highlight, or the like that is applied to item 424 upon receiving a sharing selection.

In an embodiment, once the user has selected item 424 for sharing with another user, various types of information associated with item 424 are presented to the user, as indicated in the information bar 420 shown in FIG. 4. Additionally, in an embodiment, an icon 423 is provided in viewing window 418 to indicate that at least a portion of an item has been shared with other users. In other embodiments, other visual indications that a portion of an item has been shared can be utilized.

After selecting item 424, the user, as illustrated in FIG. 4, provides input by selecting a button 430 that causes an additional UI 428 to be displayed. In an embodiment, additional UI 428 includes a pull-down menu. In another embodiment, UI 428 includes a window or other type of interface. In a further embodiment, the user right-clicks on item 424, causing the display of a context menu that includes a button that can be used to invoke UI 428.

The additional UI 428 presents a variety of options 431, 432, 434, and 436 to the user such as, for example, contact information or identification of users with whom the user can share items. Option 436 illustrated in FIG. 4 is an option that facilitates invocation of a remote sharing service. In various embodiments, the additional UI 428 provides a number of remote sharing service options, and the inclusion of only one of such options in FIG. 4 and the description here is not intended to limit the contents of such a UI.

Figure 5:
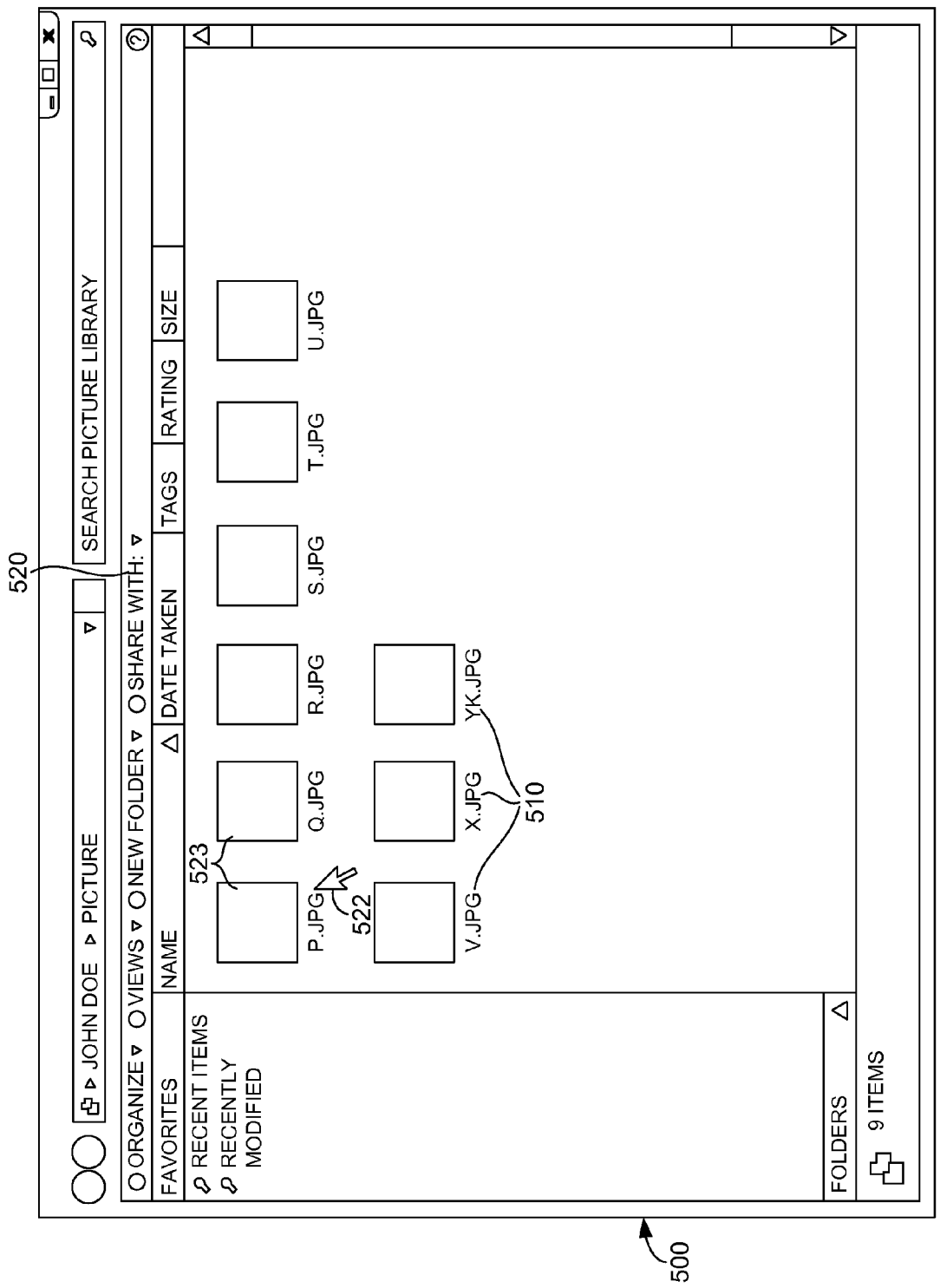
FIGS. 5-8 provide a series of exemplary screenshots that illustrate an exemplary user interface being utilized in accordance with an embodiment of the present invention.

Turning now to FIG. 5, an exemplary screenshot of an illustrative UI 500 according to an embodiment of the present invention is shown for the purpose of illustrating an embodiment of a method of sharing an item that resides on a first computing device having a display that renders UI 500. As illustrated in FIG. 5, UI 500 includes icons 510 that represent items that can be shared with another user by way of a local sharing application and/or remote sharing services. UI 500 also includes a button 520 on a task bar that facilitates presentation of sharing options incident to user input to button 520. According to an embodiment of the present invention, a user positions cursor 522 over an icon that represents an item that the user wishes to share. In other embodiments, cursor 522 is used to select several items 523 that can be shared simultaneously.

Figure 6:
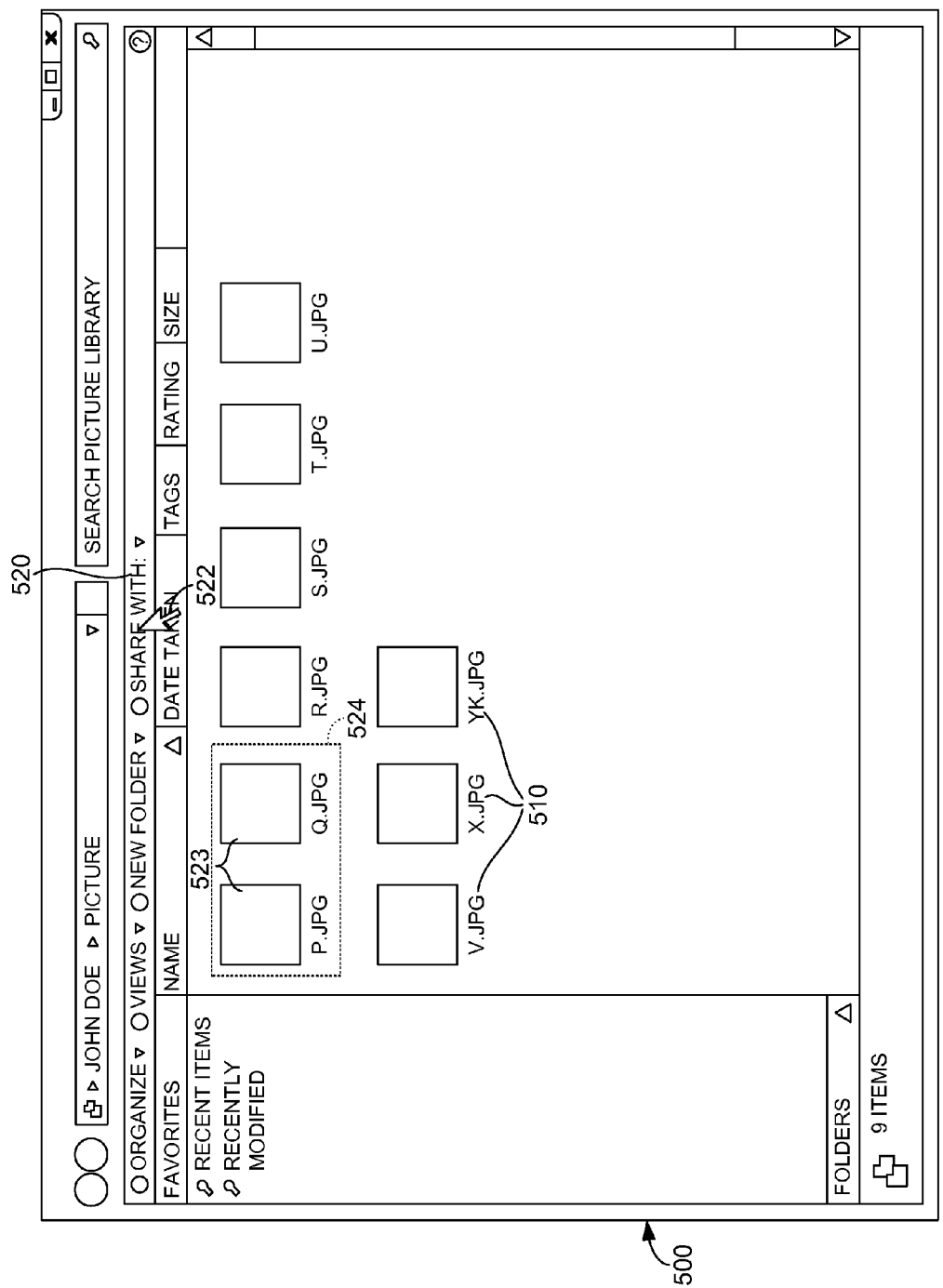
Figure 7:
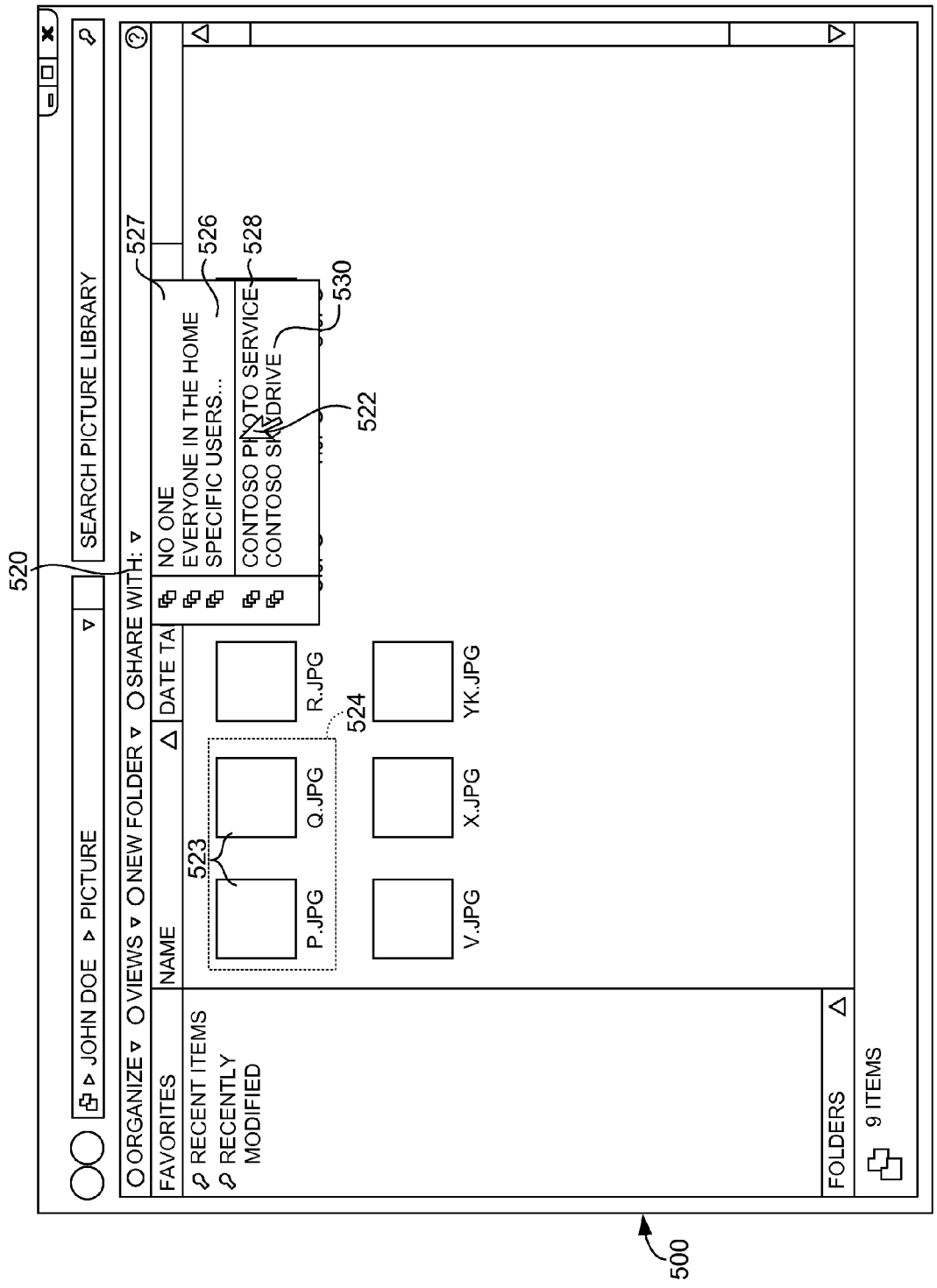

Turning to FIG. 6, UI 500 is shown wherein the user has utilized cursor 522 to select two items 523 for sharing. An indication 524 of the selection is presented on UI 500 so that the user can see that items 523 were selected. As shown in FIG. 6, the user then moves cursor 522 to position it over button 520. Upon selecting button 520, as illustrated in FIG. 7, a pull-down menu 527 is presented to the user. Button 520 can be selected in various ways such as, for example, by clicking on the button with a mouse, by tapping on the button with a stylus (where the display is a touch-screen display), by a particular keystroke or series of keystrokes, and the like.

As further illustrated in FIG. 7, menu 527 includes several options 526 for choosing particular users with whom the selected items can be shared. Menu 527 also includes remote sharing service options 528 and 530 for choosing one or more remote sharing services to invoke for sharing items. In an embodiment, all of the remote sharing services that have registered with a computing device can be accessible from menu 527. Accordingly, one aspect of the present invention provides the ability to plug all of the remote sharing service applications into one easily accessible location. As shown in FIG. 7, the user has positioned curser 522 over an option 528 for invoking a "Contoso Photo Service" by which the user may share photos or other items with another user. Upon selection of option 528, the "Contoso Photo Service" is invoked, and a sharing-service application provided by "Contoso Photo Service," which has been installed on the user's computer incident to the "Contoso Photo Service" registering with the user's computer, is initiated.

Figure 8:
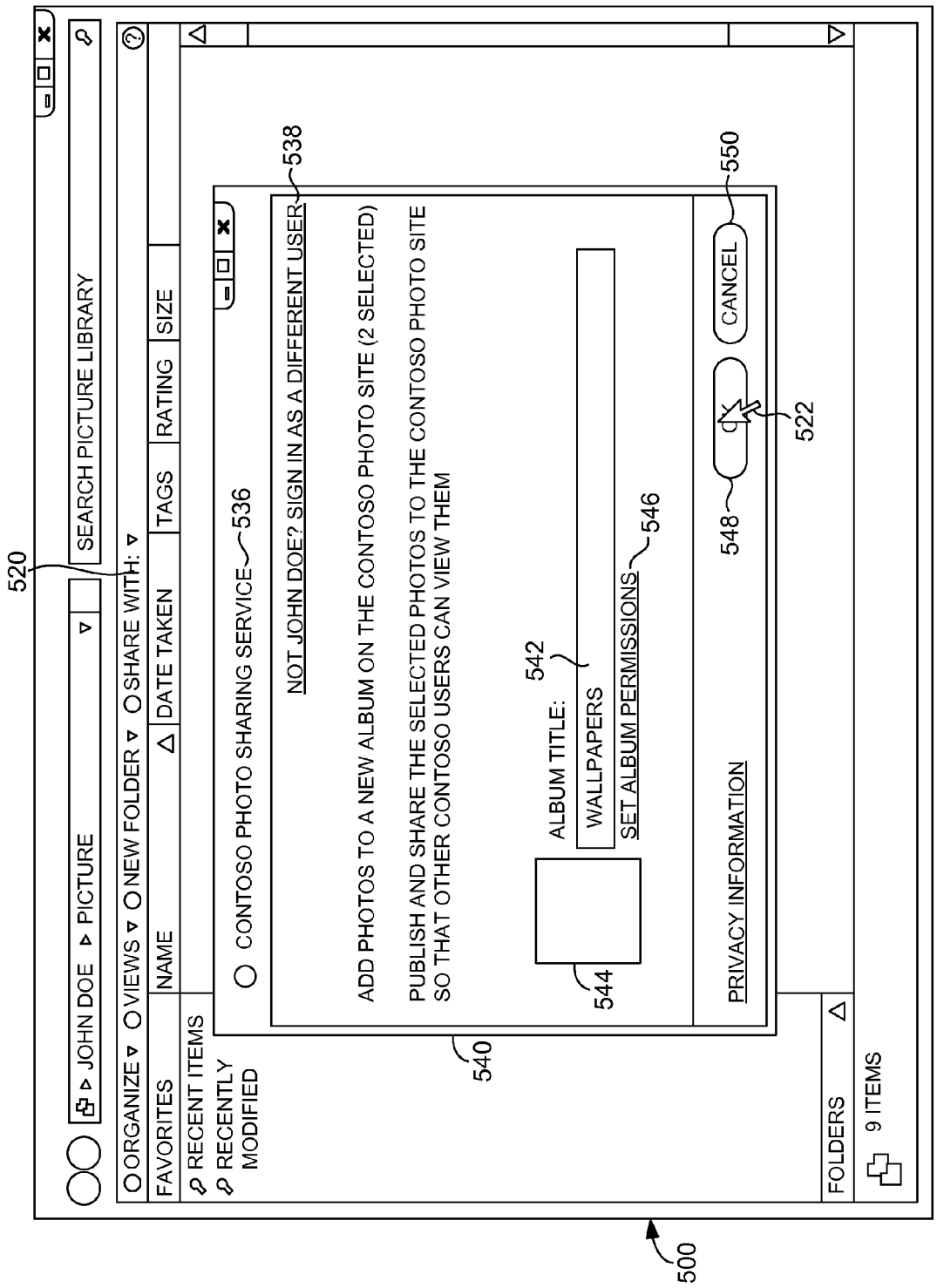

The sharing-service application provides another UI 540, as illustrated in FIG. 8. UI 540 facilitates sharing items with another user by way of "Contoso Photo Service." As shown in FIG. 8, UI 540 includes various features such as an identification 536 of the remote sharing service that provides UI 540, a first option 538 to sign in to the sharing service as a different user, an icon 544 that represents a storage component associated with the sharing service, a text-input box 542 for applying a label to the shared items or to a container in which the shared items will be stored at the sharing service, and a second option 546 for accessing an additional UI that facilitates the selection of access permissions to be applied to shared items. The UI 540 also includes additional options 548 and 550 for accepting option selections or canceling the invocation of the sharing service, respectively. UI 500, as illustrated in FIG. 8 is only an example of a UI that can be provided by a remote sharing service. In some embodiments, each remote sharing service has a differently configured UI that includes different options and functionalities than the UI 540 illustrated herein.

As illustrated in FIG. 8, the user has input a name of "Wallpapers" to the text input box 542 and has positioned cursor 522 over the "OK" button 548. Upon selecting the "OK" button 548, in an embodiment, copies of the items selected for sharing will be provided to "Contoso Photo Service" and will be accessible to another user that the user has selected, in accordance with the access permissions that the user has applied to the copies of the items. In the illustrated embodiment, the copies will be located in a container labeled "Wallpapers." Simultaneously, incident to selection of the "OK" button 548, the sharing-service application will interface with a local sharing application or service to apply the same access permissions to the actual items residing on the user computer such that the users having access permissions as defined within the "Contoso Photo Service" have immediate accessibility to the locally maintained items according to the same permissions.

Figure 9:
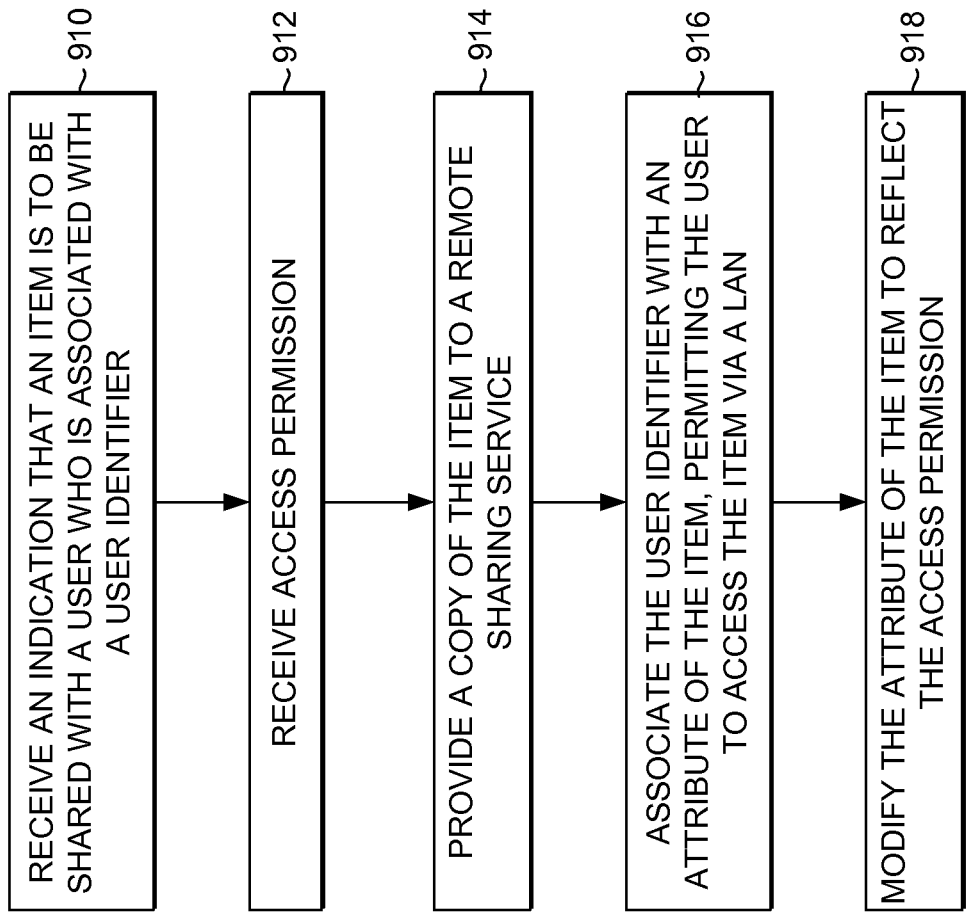
FIG. 9 is a flow diagram showing an illustrative method of sharing an item in accordance with an embodiment of the present invention.

To recapitulate, we have described systems and methods for sharing an item that resides on a first computing device. Turning now to FIG. 9, a flow diagram is provided that shows an illustrative example of a method of sharing an item that resides on a first computing device in accordance with an embodiment of the present invention. In various embodiments, the item can be a file, a folder containing a plurality of files, a program, and the like. In other embodiments, the item can be a device such as a printer, scanner, connected hard drive, and the like. At a step 910, an indication that an item is to be shared with a user who is associated with a user identifier is received. In an embodiment, the user identifier is an identifier used by the remote sharing service to identify the user. In some embodiments, the remote sharing service generates the identifier and provides it to the first computing device. In other embodiments, other services or entities can generate and/or provide the user identifier.

At step 912, an access permission is received. In various embodiments, users set access permissions that allow various levels or types of access to an item such as, for example, "read only," "edit," "full access," and the like. At step 914, a copy of the item is provided to a remote sharing service. In an embodiment, the remote sharing service permits the user to access the copy of the item based on the user identifier being authenticated by the sharing service. Additionally, as shown at step 916, the user identifier is associated with an attribute of the item to permit the user to access the item via a LAN. In embodiments, the LAN facilitates communication between a second computing device, which is associated with the user, and the first computing device. In various embodiments, the attribute that is modified is a security descriptor that includes an ACL. According to embodiments of the present invention, associating the user identifier with the attribute makes the item immediately available to the user by way of the LAN. In a final illustrative step, step 918, the attribute of the item is modified to reflect the access permission.

Figure 10:
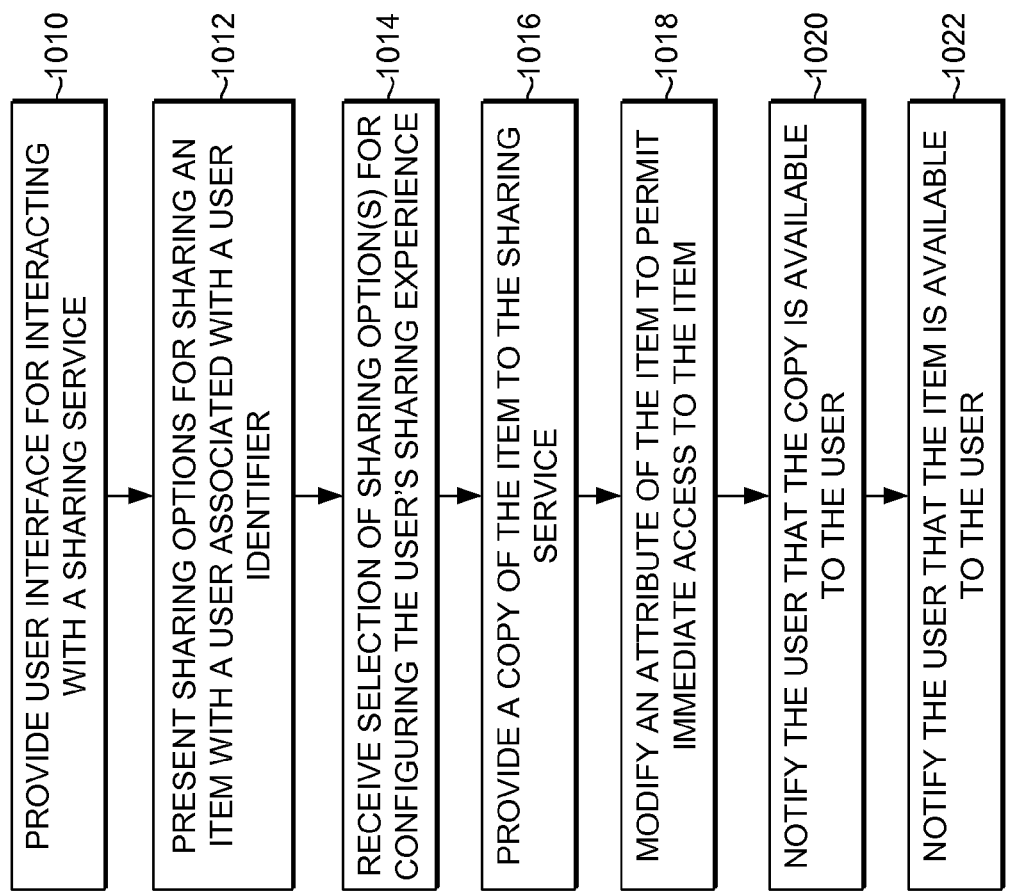
FIG. 10 is a flow diagram showing an illustrative method of sharing an item in accordance with an embodiment of the present invention.

Turning now to FIG. 10, another flow diagram is provided that shows an illustrative example of a method of sharing an item that resides on a first computer in accordance with an embodiment of the present invention. At a step 1010, a user interface is provided that enables interaction with a remote sharing service. The user interface, as shown at step 1012, presents sharing options for configuring the user's sharing experience corresponding to the item such that the user is permitted to access a copy of the item by way of the remote sharing service according to sharing options. In various embodiments, the sharing options can include access permissions, selections of users, or other options that impact the user's sharing experience.

At a step 1014, a selection of one or more of the sharing options is received and, at step 1016, a copy of the item is provided to the sharing service. At step 1018, an attribute of the item is modified to permit the user immediate access to the item from a second computing device upon establishing a connection with the first computing device. In an embodiment, the attribute is a security descriptor which includes a DACL.

In various embodiments, the connection between the two computing devices includes a network common to the two computing devices such as, for example, a LAN or a WAN, that includes a number of LANs. At a step 1020, the user is notified that the copy of the item is available to the user by way of the remote sharing service. In an embodiment, a process located on the first computing device provides the notification. In other embodiments, the remote sharing service provides the notification. At a final illustrative step, step 1022, the user is also notified that the item is available to the user by way of access (e.g., through a LAN, WAN, and the like) to the first computing device. The order in which the notifications are presented can occur opposite the order presented above. Additionally, the notifications can occur simultaneously, as can various other steps in this and other embodiments of the method.

Figure 11:
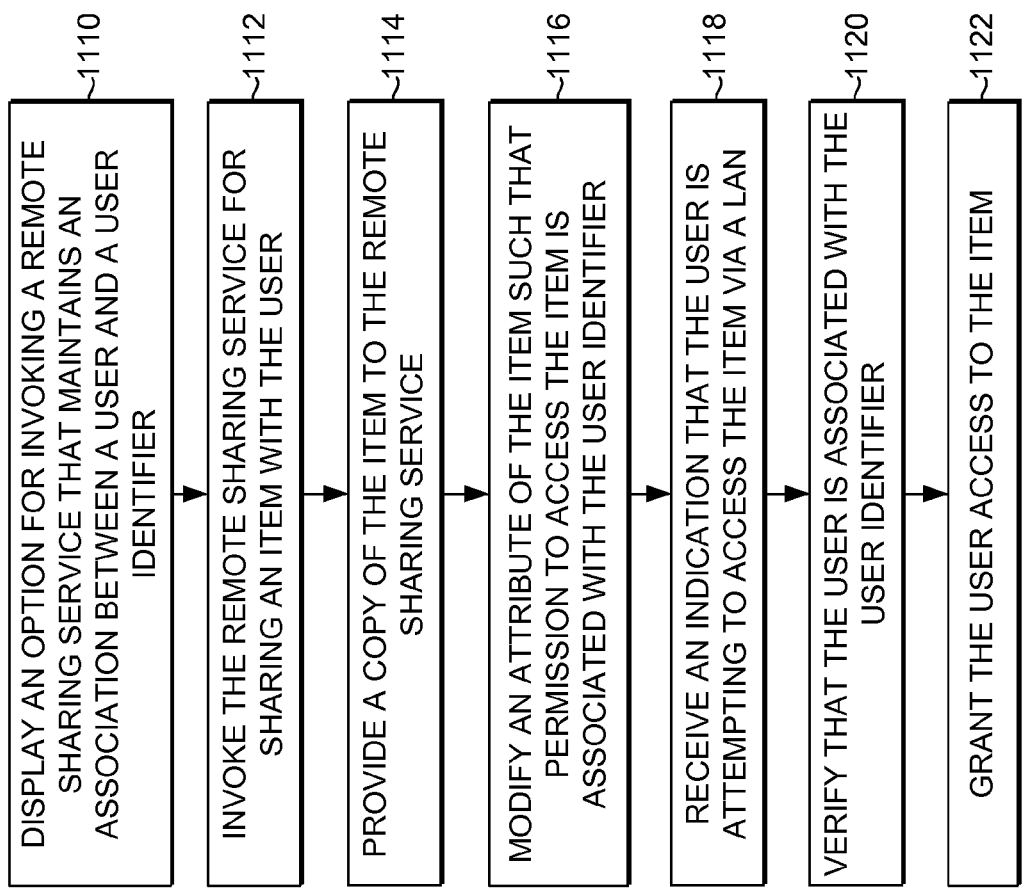
FIG. 11 is a flow diagram showing an illustrative method of sharing an item in accordance with an embodiment of the present invention.

Turning now to FIG. 11, a final illustrative flow diagram is provided that shows another example of a method of sharing an item that resides on a first computing device in accordance with an embodiment of the present invention. At a step 1110, an option for invoking a remote sharing service that facilitates sharing the item with a user is provided. The sharing service maintains an association between the user and a user identifier. At a step 1112, the remote sharing service is invoked, and at step 1114, a copy of the item that can be accessed by the user is provided to the sharing service such that permission to access the copy is based upon the user identifier. In an embodiment, invoking the remote sharing service causes a UI to be provided. In other embodiments, invocation of the sharing service results in retrieval of a web page associated with the sharing service that includes a UI.

At step 1116, an attribute of the item is modified such that permission to access the item is associated with the user identifier. The modification makes the item immediately available to the user by way of a LAN that connects the first computing device with a second computing device associated with the user. At step 1118, an indication that the user is attempting to access the item via the LAN is received, and at a step 1120, the user's association with the user identifier is verified. At a final illustrative step, step 1122, the user is granted access to the item.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

For example, in one embodiment, a sharing-service application may be installed as a plug-in function to a local sharing application. In another embodiment, a sharing-service application may be automatically installed pursuant to a request to install communicated from a sharing server to a computing device. In a further embodiment, an update functionality may be incorporated such that an ACL associated with an item is automatically updated to reflect a change in a user identifier associated with a copy of the item hosted by a sharing service.

According to an embodiment of the present invention, a control panel user interface may be provided, which displays all of the items that can be shared, and includes various tools and objects that facilitate sharing the items with other users. In another embodiment, a sharing subfolder is provided within a start menu. Selection of the subfolder can invoke various aspects of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more computer-readable storage media ("media") not a signal per se having computer-executable instructions embodied thereon for performing a method of sharing an item that resides on a first computing device, the method comprising:
   receiving, at the first computing device, an indication to share the item with a second computing device having a computing device identifier;
   modifying a security descriptor of the item to comprise the computing device identifier of the second computing device;
   providing a copy of the item to a remote sharing service that permits the second computing device to access the copy of the item based on the computing device identifier of the second computing device, wherein the computing device identifier of the second computing device is generated by the remote sharing service; and
   providing the second computing device access to the copy of the item based on modifying the security descriptor associated with the item to comprise the computing device identifier of the second computing device, wherein access to the item is provided by way of a local area network (LAN) that facilitates communication between the second computing device and the first computing device such that accessibility to the items is limited to the second computing device and limited to sessions where the first computing device and second computing device are connected to each other over the LAN.

2. The media of claim 1, wherein the computing device identifier is a network access identifier (NAI).

3. The media of claim 1, wherein the item comprises one of a group consisting of a file and a folder, wherein the folder contains at least one file.

4. The media of claim 1, wherein the computing device identifier is provided by the remote sharing service via a sharing-service application running on the first computing device.

5. The media of claim 1, wherein providing the second computing device access to the copy of the item comprises making the item immediately available to the user.

6. The media of claim 1, further comprising receiving an access permission setting that defines a type of access to the copy that the second computing device is permitted.

7. The media of claim 6, further comprising modifying the attribute of the item such that the item is made available to the second computing device according to the access permission setting.

8. One or more computer-readable storage media ("media") not a signal per se having computer-executable instructions embodied thereon for performing a method of sharing an item that resides on a first computing device, the method comprising:
   providing, on the first computing device, a user interface that presents at least one sharing option for sharing the item with a second computing device having a computing device identifier, wherein the user interface enables interaction with a plurality of remote sharing services via a menu;
   receiving a selection of the at least one sharing option for configuring a sharing experience corresponding to the item such that the second computing device is permitted to access a copy of the item by way of at least one of the plurality of remote sharing services according to the at least one sharing option;
   modifying an attribute of the item such that the second computing device is immediately permitted to access the item upon establishing a connection with the first computing device; and
   notifying the second computing device that the copy of the item is available to the second computing device via the at least one of the plurality of remote sharing services.

9. The media of claim 8, wherein the computing device identifier comprises a network access identifier (NAI).

10. The media of claim 8, wherein the attribute of the item comprises a security descriptor of the item.

11. The media of claim 10, wherein modifying the attribute of the item comprises modifying the security descriptor of the item to comprise the computing identifier of the second computing device.

12. The media of claim 8, wherein the at least one sharing option comprises an access permission setting that defines a type of access.

13. The media of claim 8, further comprising notifying the second computing device that the item is available to the second computing device via a network.

14. One or more computer-readable storage media ("media") not a signal per se having computer-executable instructions embodied thereon for performing a method of sharing an item that resides on a first computing device, the method comprising:
- displaying, on the first computing device, an option for invoking a remote sharing service that facilitates sharing the item with a second computing device, wherein the remote sharing service maintains an association between the second computing device and a computing device identifier of the second computing device, wherein the remote sharing service generates the computing device identifier;
- invoking the remote sharing service such that the remote sharing service retrieves a copy of the item that may be accessed by the second computing device based on a permission to access the copy of the item, wherein the permission to access the copy of the item is associated with the computing device identifier;
- modifying a security descriptor of the copy of the item such that permission to access the item is associated with the computing device identifier of the second computing device;
- receiving an indication that the second computing device is attempting to access the copy of the item; and
- granting the second computing device access to the copy of the item incident to verifying that the second computing device identifier is associated with the permission to access the item.

15. The media of claim 14, wherein modifying the security descriptor of the item comprises making the item immediately available to the second computing device by way of the local area network (LAN).

16. The media of claim 14, wherein invoking the remote sharing service comprises retrieving a web page from the remote sharing service, wherein the web page includes a user interface for interacting with the remote sharing service.

17. The media of claim 14, wherein the security descriptor comprises an access control list (ACL).

18. The media of claim 14, wherein the computing device identifier comprises a network access identifier (NAI).

19. The media of claim 1, wherein accessibility to the item is restricted using a discretionary access control list.

20. The media of claim 8, wherein the notification is transmitted from the first computing device to the second computing device.

* * * * *